US005940122A

United States Patent [19]

Kizawa et al.

[11] Patent Number: 5,940,122
[45] Date of Patent: Aug. 17, 1999

[54] HOUSING ASSEMBLY FOR HOUSING A SURVEILLANCE TELEVISION CAMERA

[75] Inventors: Shigemitsu Kizawa; Koji Shindo, both of Tokyo; Toshiyuki Hisatsune, Kanagawa, all of Japan

[73] Assignee: Sony Corporation, Tokyo, Japan

[21] Appl. No.: 08/032,241

[22] Filed: Mar. 17, 1993

[30] Foreign Application Priority Data

Mar. 23, 1992 [JP] Japan .................................... 4-095853

[51] Int. Cl.$^6$ ........................................................ H04N 7/18
[52] U.S. Cl. ............................................ 348/151; 348/143
[58] Field of Search .................................... 348/151, 373, 348/207, 156, 143; H04N 7/18

[56] References Cited

U.S. PATENT DOCUMENTS

| | | | |
|---|---|---|---|
| 3,739,703 | 6/1973 | Behles | 348/151 |
| 3,916,097 | 10/1975 | Imai | 348/151 |
| 3,993,866 | 11/1976 | Pearl | 348/151 |
| 4,160,999 | 7/1979 | Claggett | 348/373 |
| 4,320,949 | 3/1982 | Pagano | 348/373 |
| 4,414,576 | 11/1983 | Randmae | 348/151 |
| 4,833,534 | 5/1989 | Paff et al. | 348/151 |
| 4,901,146 | 2/1990 | Struhs et al. | 348/151 |
| 4,982,281 | 1/1991 | Gutierrez | 348/151 |
| 5,121,215 | 6/1992 | Boers et al. | 348/373 |
| 5,223,872 | 6/1993 | Stiepel et al. | 348/143 |

FOREIGN PATENT DOCUMENTS

| | | | |
|---|---|---|---|
| 0435007 | 7/1991 | European Pat. Off. | G08B 13/19 |
| 0468839 | 1/1992 | European Pat. Off. | G08B 15/00 |

*Primary Examiner*—Vu Le
*Attorney, Agent, or Firm*—Ronald P. Kananen; Rader, Fishman & Grauer

[57] ABSTRACT

A housing assembly for housing a surveillance television camera comprises a housing member to house the surveillance television camera therein, having a front wall provided with a window paned with a glass filter through which the surveillance television camera receives light rays representing the scene of a surveillance zone, and a flange to be fastened to a fixed structure; and covering member to cover the housing member, having a front wall provided with an opening which is positioned opposite to the window of the housing member when the covering member is put on the housing member, and capable of covering the housing member so that the surveillance television camera housed in the housing member will not be perceptible. Since the housing assembly is simple in shape and appearance and can be colored in a color harmonizing with the ambient color, the housing assembly is scarcely noticeable and does not make people aware of being under surveillance.

4 Claims, 2 Drawing Sheets

HOUSING ASSEMBLY FOR HOUSING A SURVEILLANCE TELEVISION CAMERA

BACKGROUND OF THE INVENTION

1. Field of the Invention

The present invention relates to a housing assembly for housing a surveillance television camera.

2. Description of the Prior Art

The surveillance television camera has been used in CCTV systems (closed-circuit television systems) for surveillance to prevent crimes. Recently, the surveillance television camera has been applied to various purposes, such as security management in public installations where a great many people gather, for example, railroad stations, customer management in service industries, for example, hotel business, and market research for investigating and analyzing the flow of people, in addition to surveillance to prevent crimes.

As shown in FIG. 1, when using a surveillance television camera assembly 31 comprising a surveillance television camera 31*a,* such as an industrial CCD camera, and a bracket 31*b* for such purposes including surveillance, management, investigation and analysis, the surveillance television camera 31*a* is attached to the bracket 31*b,* and the bracket 31*b* is fixed to the ceiling or the wall. A surveillance television camera having a cylindrical or a dome-like external shape and suspended from the ceiling or held on the wall by a bracket has been also used for the same purposes.

Since the conventional surveillance television camera is suspended from the ceiling or held on the wall by the bracket, the surveillance television camera can easily be seen by people who will soon notice that they are under surveillance. Although such easily noticeable disposition of the surveillance television camera may be effective for producing a warning and preventing crimes, effective data for security management in places, such as railroad stations, here a great many people gather, customer management in service industries, such as hotel business, and market research for investigating and analyzing the flow of people cannot be acquired because people will be aware of the surveillance television camera and will be conscious of being under surveillance.

A housing assembly for electrical apparatus, disclosed in U.S. Pat. No. 4,414,576 has a housing capable of being opened to house a television camera. This housing in which a surveillance television camera is housed may be less noticeable than the un-enclosed industrial CCD camera and the surveillance television camera having a cylindrical or dome-like external shape. However, this housing assembly does not perfectly harmonize with the ceiling or the wall and hence people will be more or less conscious of being under surveillance.

SUMMARY OF THE INVENTION

Accordingly, it is an object of the present invention to provide a housing assembly capable of concealing a surveillance television camera therein so that people will not be aware of the surveillance television camera.

A housing assembly for housing a surveillance television camera, in one aspect of the present invention comprises: a housing member to house the surveillance television camera therein, having a front wall provided with a window paned with a glass filter through which the surveillance television camera receives light rays representing the scene of a surveillance zone, and a flange to be fastened to a fixed structure; and a covering member to cover the first housing member, having a front wall provided with an opening which is positioned opposite to the window of the housing member when the covering member is put on the housing member, and capable of covering the housing member so that the surveillance television camera housed in the housing member will not be perceptible.

BRIEF DESCRIPTION OF THE DRAWINGS

The above and other objects, features and advantages of the present invention will become more apparent from the allowing description taken in connection with the accompanying drawings, in which.

DETAILED DESCRIPTION OF THE PREFERRED EMBODIMENTS

Figure 1:
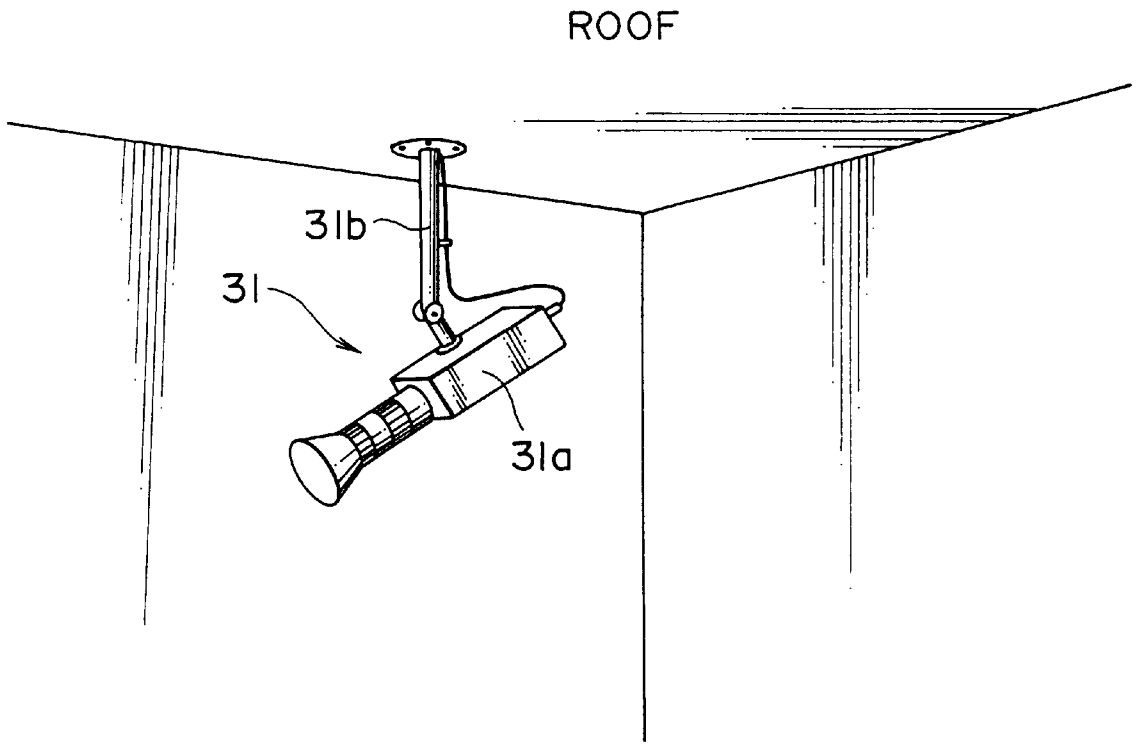
FIG. 1 is a perspective view of a conventional surveillance television camera as installed in a place to be observed.
Figure 2:
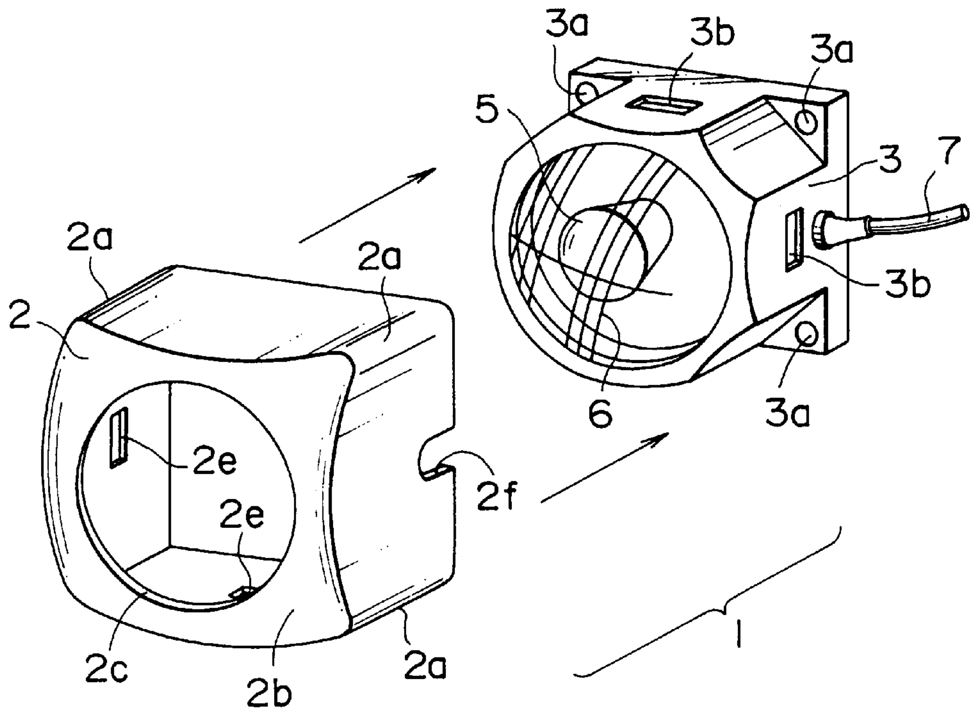
FIG. 2 is an exploded perspective view of a housing assembly in a preferred embodiment according to the present invention.
Figure 3:
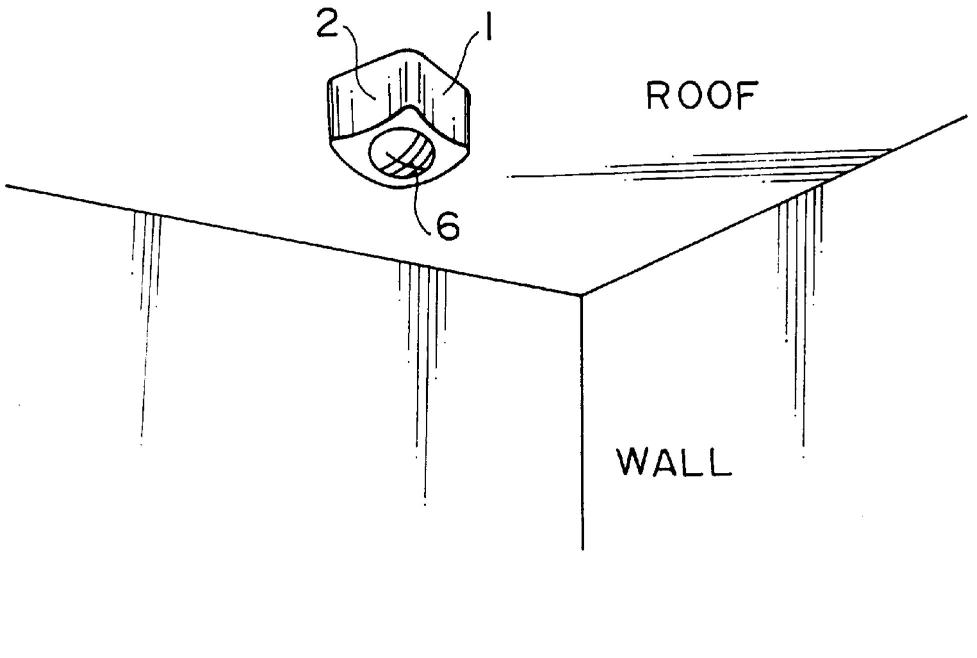
FIG. 3 is a perspective view of the housing assembly of FIG. 2 as installed on the ceiling of a room.

Referring to FIG. 2, a housing assembly 1 comprises a housing member 3 and a covering member 2. A television camera comprising a lens 5, a CCD imaging device, not shown, and an electric circuit, not shown, is installed in the housing member 3. A cover attached to the rear end of the housing member 3 is opened for the maintenance of the television camera, for setting the television camera in a desired position or for changing the direction of the optical axis of the television camera. The housing member 3 has a generally rectangular shape and is provided with a rectangular flange formed by beveling the four edges thereof. The flange is provided with through holes 3*a* through which screws are screwed into a fixed structure to fasten the housing member 3 to the fixed structure. Holes 3*b* are formed respectively in the four side walls of the housing member 3. The housing member 3 is provided with a window of a relatively large diameter in its front wall. The window is paned with a curved glass filter 6. The television camera comprising a lens 5, a CCD imaging device and a electric circuit is sealed in the housing member 3. A cable 7 connected to the television camera received in the housing member 3, extends through one side wall of the housing member 3. Although the housing member 3 having the beveled edges and provided with the through holes 3*a* has an aesthetically unsatisfactory appearance, the housing member 3 is designed so that it is easy to form and easy to attached to a desired structure. An aesthetic appearance is achieved by enclosing the housing member 3 entirely within a covering member 2.

The covering member 2 has of a substantially rectangular cup shape. The four edges 2*a* of the covering member 2 are rounded and the front wall 2*b* thereof is curved so as to have a spherical shape. The covering member 2 is provided with an opening 2*c* in the front wall 2*b*. When the covering member 2 is put on the housing member 3, the opening 2*c* is positioned opposite to the glass filter 6. Four projections 2*e* are formed in the inner surfaces of the side walls of the covering member 2. When the covering member 2 is put on the housing member 3, the projections 2*e* snap into the holes 3*b* formed in the side walls of the housing member 3 to hold the covering member 2 securely on the housing member 3. A recess 2*f* is formed in one side wall of the covering member 2 at a position corresponding to the cable 7.

The cable 7 is connected to a camera control unit, a camera switching unit, a split screen adapter and the like installed in a monitor room. A time lapse VTR, a video monitor and the like are connected to the foregoing devices. If the ceiling or the wall to which the housing member 3 is attached is provided internally with wiring passages, the cable 7 is inserted into a nearby wiring passage so that the minimum of the cable 7 is exposed alternately the cable 7 may be arranged to extend through the rear wall of the housing member 3 and be inserted into wiring passage extending behind the housing member 3.

In use the housing member 3 housing the surveillance television camera is fastened to a fixed structure, the covering number 2 is put on the housing member 3 with the projections 2*e* thereof engaging the holes 3*b* of the housing member 3 and the cable 7 is connected to the monitoring equipment installed in the monitoring room to complete a CCTV system. The CCTV system is installed in a desired place according to purposes such as security management in a public installation where a great many people gather, such as a railroad station, customer management in service industries, such as hotel business, or market research for investigating and analyzing the flow of people.

Since the covering member 2 of the housing assembly 1 is simple in shape and appearance, the housing assembly 1 is scarcely noticeable. If the covering member 2 has the same or similar color to that of its surrounding, the housing assembly 1 merges into the background and becomes less noticeable. Since the housing assembly 1 is simple in shape and appearance, and the television camera sealed in the housing member 3 is covered with the glass filter 6, people will mistake the housing assembly 1 for a smoke detector, a sprinkler or a loudspeaker if actually noticed. Thus, the housing assembly 1 attenuates the tendency for people to become aware that they are under surveillance.

When the color of the housing assembly 1 does not harmonize with the surrounding background color, the housing assembly 1 can be colored in a desired color on the site by painting or the like. When changing the color of the housing assembly, the covering member 2 is removed from the housing member 3, and only the covering member 2 may be painted in a desired color. Therefore, the color filter 6 will not be smeared with paint.

As is apparent from the foregoing description, the housing assembly according to the present invention harmonizes easily with the ambience, is scarcely noticeable when installed in a desired place, and does not make people aware of being under surveillance.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A surveillance television camera housing assembly, comprising:

a stationary housing member which houses a surveillance television camera therein, the housing member having a front wall provided with a window which is paned with a glass filter through which the surveillance television camera receives light rays representing the scene of a surveillance zone, the housing member having a flange portion formed at a base portion thereof, the flange portion being arranged to seat against and to be fastened to a fixed structure; and a single-piece covering member which completely encloses the housing member, the covering member having a front wall provided with an opening which is disposed immediately adjacent to the window of the housing member when the covering member is disposed on the housing member, the covering member covering the housing member so that outer side edges of the flange portion are enclosed and edge portions of an open end portion of the covering member immediately juxtapose the fixed structure in a manner whereby the housing member is totally concealed and the covering member seats flush against the fixed structure.

2. A housing assembly according to claim 1, wherein said covering member is disposed on said housing member to cover the housing member entirely excluding the window of the housing member, and the covering member is secured detachably to the housing member by fastening means.

3. A housing assembly according to claim 2, wherein said fastening means comprises holes formed respectively in the side walls of the housing member and projections formed respectively on the inner surfaces of the side walls of the covering member, and the projections of the covering member engage the holes of the housing member, respectively, to hold the covering member securely on the housing member when the covering member is disposed on the housing member.

4. A surveillance television camera housing assembly, comprising:

a static essentially rectangular prismatic housing member which encloses a television camera, said housing member having a substantially flat base end and a top end, the base end being formed with a flat attachment flange which is adapted to be connected to a fixed structure, said top end being formed with a domed portion, said domed portion being formed with a window which is paned with a transparent glass filter; and a unitary one-piece covering member which completely encloses said housing member, said covering member having an open end and a closed end, said closed end having an opening which is disposed immediately adjacent the window of the housing member when the covering member is disposed on the housing member, said covering member enclosing the housing member so that side edges of said flange portion are enclosed by said open end and edge portions of said open end immediately juxtapose the fixed structure in a manner wherein the housing member is totally concealed.

* * * * *